United States Patent [19]

Crosley

[11] 3,851,120

[45] Nov. 26, 1974

[54] COMBINED TIMING-OUTPULSING-SCANNING CIRCUIT

[75] Inventor: Thomas W. Crosley, Northlake, Ill.

[73] Assignee: GTE Automatic Electric Laboratories Incorporated, Northlake, Ill.

[22] Filed: June 15, 1973

[21] Appl. No.: 370,560

[52] U.S. Cl. .......................... 179/175.2 R, 235/92 T

[51] Int. Cl. .......................................... H04m 3/24

[58] Field of Search ....... 235/92 T, 132 A; 179/175, 179/175.2 R

[56] References Cited

UNITED STATES PATENTS

| | | | |
|---|---|---|---|
| 2,970,226 | 1/1961 | Skelton et al. | 235/132 A |
| 3,265,867 | 8/1966 | Venn et al. | 235/92 T |
| 3,564,217 | 2/1971 | Bounsall | 235/92 PE |
| 3,636,549 | 1/1972 | Berman et al. | 235/92 T |
| 3,789,195 | 1/1974 | Meier et al. | 235/92 T |

*Primary Examiner*—Kathleen H. Claffy
*Assistant Examiner*—Douglas W. Olms

[57] ABSTRACT

This invention relates to the architecture of the timer-scanner, one of several common circuits of an automatic test system of an electronic exchange. It performs the various timing functions required in the system and will time intervals from 10 ms to 2 seconds as required. The pre-setting of the timer is performed in response to external signals from the routiner logic.

2 Claims, 11 Drawing Figures

PATENTED NOV 26 1974 3,851,120

SHEET 04 OF 10

LAST DIGIT LATCHES AND CONTROL

COMBINED TIMING-OUTPULSING-SCANNING CIRCUIT

CROSS-REFERENCES TO RELATED APPLICATIONS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 130,133 now abandoned filed Apr. 1, 1971 by K. E. Prescher, R. E. Schauer and F. B. Sikorski, and a continuation-in-part thereof Ser. No. 342,323, filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480 now Pat. No. 3,729,715 filed May 3, 1971 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851 now Pat. No. 3,737,873 filed Nov. 24, 1971 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1971, Ser. No. 270,909, now Pat. No. 3,784,801, by J. P. Caputo and F. A. Weber for a DATA HANDLING SYSTEM ERROR AND FAULT DETECTING AND DISCRIMINATING MAINTENANCE ARRANGEMENT, Ser. No. 270,910, now Pat. No. 3,783,255, by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912, now Pat. No. 3,805,038, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916, now Pat. No. 3,783,256, by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586, now Pat. No. 3,806,659, filed Aug. 17, 1972 by J. W. Eddy for an INTERLOCK ARRANGEMENT FOR A COMMUNICATION SWITCHING SYSTEM, Ser. No. 311,606 filed Dec. 4, 1972 by J. W. Eddy and S. E. Puccini for a COMMUNICATION SYSTEM CONTROL TRANSFER ARRANGEMENT, Ser. No. 303,157, now Pat. No. 3,809,822, filed Nov. 2, 1972 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412, now Pat. No. 3,814,859, filed Jan. 2, 1973 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 3, 1973 by L. V. Jones and P. A. Zelinski for a SENSE LINE PROCESSOR WITH PRIORITY INTERRUPT ARRANGEMENT FOR DATA PROCESSING SYSTEMS.

A test system for use within this system is disclosed in U.S. patent application Ser. No. 348,806, now Pat. No. 3,812,337, filed Apr. 6, 1973 by T. W. Crosley for A SEQUENTIAL CONTROL CIRCUIT HAVING IMPROVED FAULT DETECTION AND DIAGNOSTIC CAPABILITIES, and also in U.S. patent application Ser. No. 370,509 filed June 14, 1973 by T. W. Crosley, L. J. Lesny and K. F. Herr.

The above system, register-sender, marker, communication register, executive and computer line processor and test system patents and applications are incorporated herein and made a part hereof as though fully set forth.

BACKGROUND OF THE INVENTION

1. Field of the Invention

This invention relates to a communication switching system and particularly to a timer and control arrangement capable of timing a multiplicity of the operations performed in the exchange.

2. Description of the Prior Art

Prior art systems generally included a timing circuit designed for each specific application. These circuits made use of the operate and release times of relays or resistance capacitance circuits in combination with the relays in earlier circuit applications and later to various types of individual timing circuits of the solid state type in conjunction with the relays as for example that disclosed in U.S. Pat. No. 3,732,467. Timing arrangements for a plurality of functions generally include separate subcircuits operated from a central time pulse source. Apparatus according to this concept is disclosed in U.S. Pat. No. 3,692,962.

SUMMARY OF THE INVENTION

This disclosure describes a circuit named the "Hardware Timer-Scanner" which is part of the common logic of the Maintenance Routining Logic (MRL) of No. 1 EAX Electronic Automatic Exchange. The MRL is the electronic controlling logic of the Automatic Test System (ATS), a software controlled hardware subsystem used to routine space-divided equipment (such as lines, trunks, junctors, senders and receivers). The ATS has also been disclosed in the following related U.S. patent applications: *Multiple use of ATS Test Equipment*, U.S. patent application Ser. No. 370,509 filed June 14, 1973 by T. W. Crosley, L. J. Lesny and K. F. Herr; and A Sequential Control Circuit Having Improved Fault Detection and Diagnostic Capabilities, U.S. patent application Ser. No. 348,806 filed Apr. 6, 1973 by T. W. Crosley.

As mentioned in the first discloure cited above, the hardware timer/scanner is one of several common circuits used by all of the routines. It accepts inputs (requests) from the combining logic of the MRL to perform various timing functions. The hardware timer is used by itself to perform simple timing of intervals from 10 ms to 2 seconds as required by the various routines. The timer is used with the scanner to perform more complicated timing functions, such as outpulsing MF, TCMF, and dial pulse digits in register junctor and MF or TCMF receiver tests; and for scanning incoming pulse trains; dial pulse from register junctors, MF digits from MF senders and supervisory signals from outgoing trunks.

An important feature of the hardware timer is that basically one circuit is used to provide the separate functions of simple timing, outpulsing and scanning. It was desirable to combine these functions as much as possible, since only one function is required at one time during the running of the various routines. This is so because the routines generally test only one function of a space-divided unit at a time, e.g., the local register-junctor routine requires the functions of out-pulsing TCMF and dial pulse, and incoming scanning dial pulse, but all at different times.

However some timing for the routines is done by software rather than hardware, either because the timing interval is long over 2 seconds, or because the software is waiting for an interrupt. In the first case, software timing was selected to minimize the size of the hardware timer for long timing intervals which are seldom used fewer hardware timer flip-flops are required. But for the shorter timing intervals less than 2 seconds hardware timing is a must since software scheduling delays encountered when using the software timer cannot be tolerated. For the longer timing this fluctuation can be tolerated. The second use of software timing, i.e., the timing while waiting for a response (interrupt) from the MRL, of course must be done in the software.

In addition to the circuitry required for the functions of timing, outpulsing and scanning, a minimal amount of circuitry has been added to enable the entire circuit to be exercised for maintenance purposes (diagnostics).

BRIEF DESCRIPTION OF THE DRAWING

This invention will become more apparent and be better understood by reference to the following description of an embodiment of the invention taken in conjunction with the accompanying drawings in which.

DESCRIPTION OF THE PREFERRED EMBODIMENT

General Description

Figure 1:
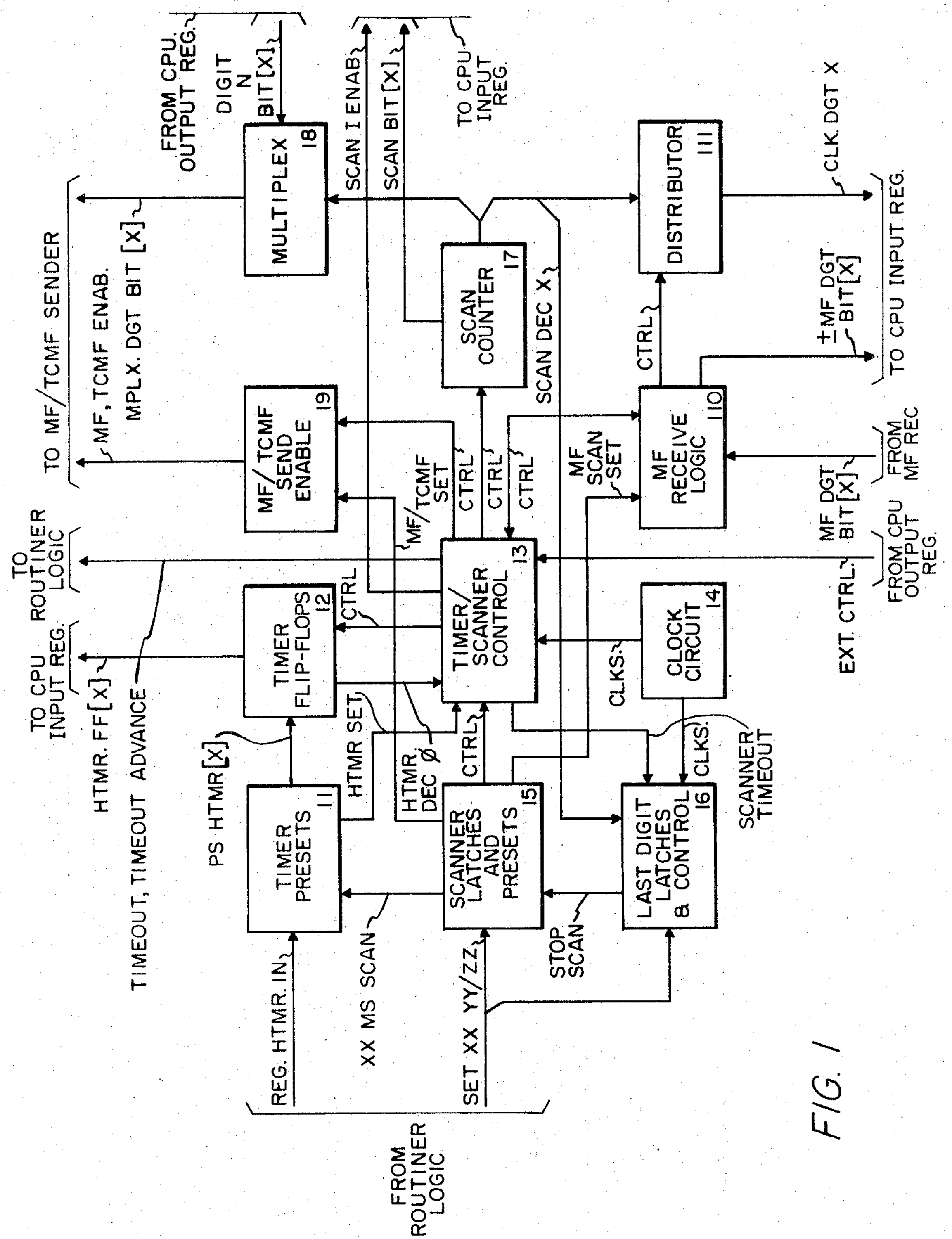
FIG. 1 is a block diagram of the functional circuit units of the timer.

A general description of the circuit will be presented next, prior to a detailed description of the circuit operation. Referring to FIG. 1, the circuit has been divided into a number of functional blocks. The basic timer/-scanner circuit actually consists of only blocks 11–17. Blocks 18–111 have been included to illustrate the two typical uses of the timer/scanner - outpulsing digits and scanning incoming digit trains. However, the applications of the timer/scanner are in no way limited to these functions, as will be discussed in a later section.

Often during the following discussion, reference will be made to "external" inputs and outputs. In the application of the timer/scanner in the MRL, the external inputs come from the routining logic, as preset inputs; from the MF test receiver, (and other sources) as inputs to the scanner control for the incoming scanning; or from the output buffer of the CPU, as control signals used for clearing the logic and for diagnostics. The external outputs of the timer/scanner go to the routing logic, timeout and timeout advance signals; to an MF/TCMF test tone sender, and other test units for outpulsing; and to the input buffer of the CPU, for relaying test results and for diagnostics.

Figure 11:
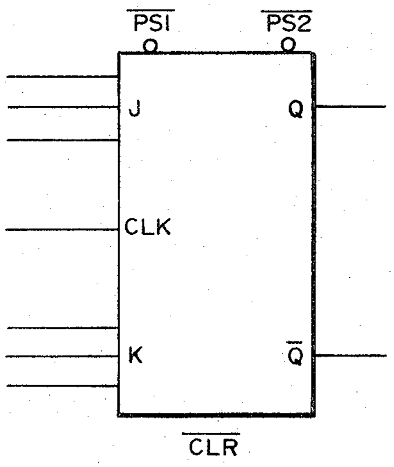
FIG. 11 illustrates the basic JK flip-flop showing the location of inputs and outputs.

Certain conventions have been followed in the logic drawings. Gates are numbered sequentially, with the first digit the same as the figure number. Standard NAND logic has been represented, using symbols for NAND gates, negated-input or gates, and inverters as appropriate. The flip-flops used, see FIG. 11, has three J inputs AND'ed together and three *k* inputs also AND'ed together. The flip-flops also has two preset inputs, clear and clock inputs, plus Q and $\overline{Q}$ outputs; it clocks on the falling edge of a pulse.

Timer Presets

Figure 3:
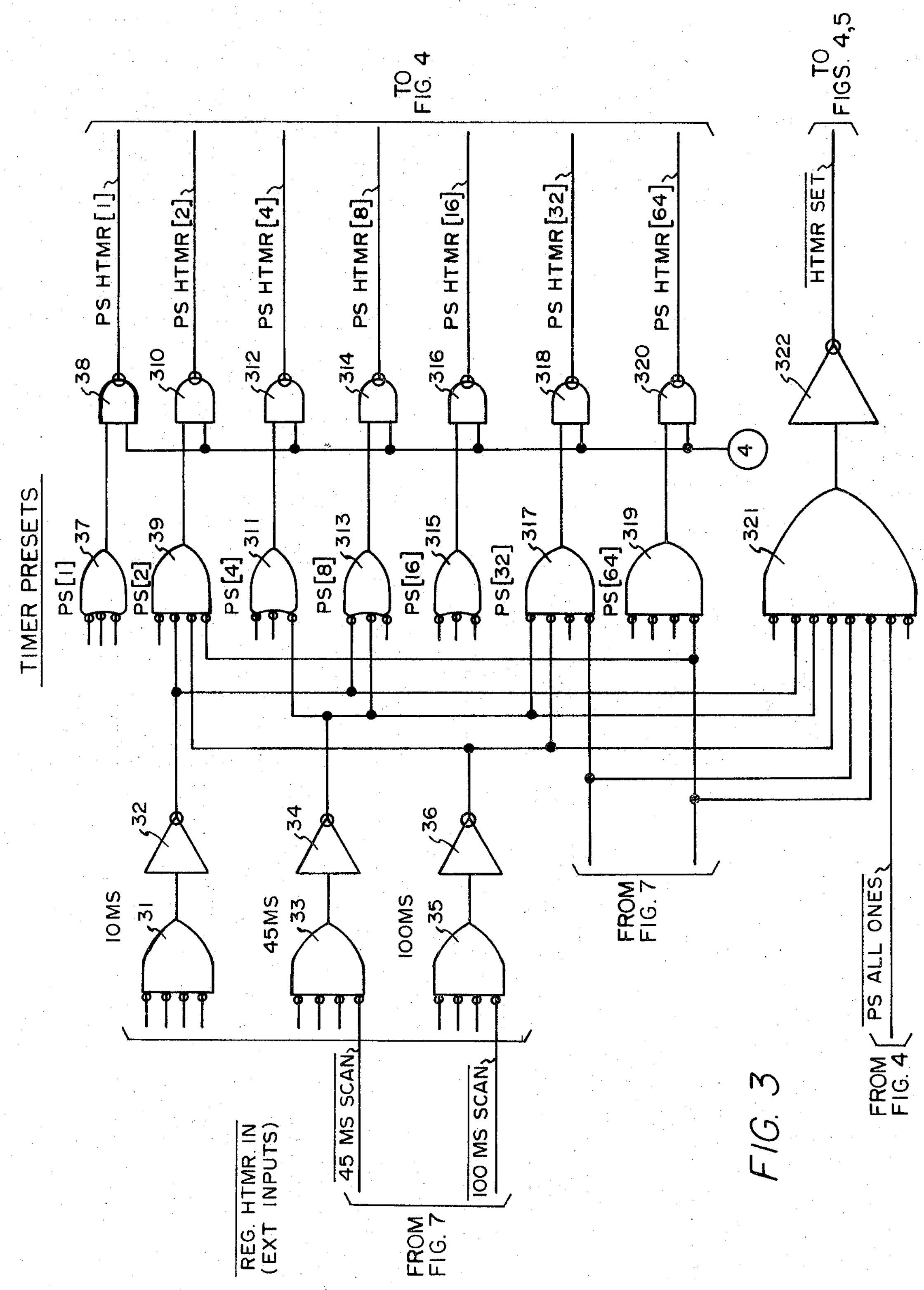
FIG. 3 is a simplified schematic of the timer preset circuit.

The timer preset circuit, Block 11 in FIG. 1, is shown in more detail in FIG. 3. It accepts inputs from two sources - the scanner presets, FIG. 7, and from external inputs $\overline{\text{REG HTMR IN}}$, e.g., the combining logic of the MRL. It translates a request on one of the input lines to the appropriate binary value. Several typical values (10, 35, 45, 65 and 100 ms) are shown; the hardware timer/scanner in the MRL provides for many additional values, up to 2 seconds. Note that the binary value that results is not exactly the same as the input in most cases; e.g., an input for 100 ms results in a preset of 98.

This is due to an offset introduced by using a 1.024 ms clock discussed in more detail later. Also note that some gates not needed for this example (37 and 315, and shown unused) would be required for other input values.

Timer Flip-Flops

Figure 4:
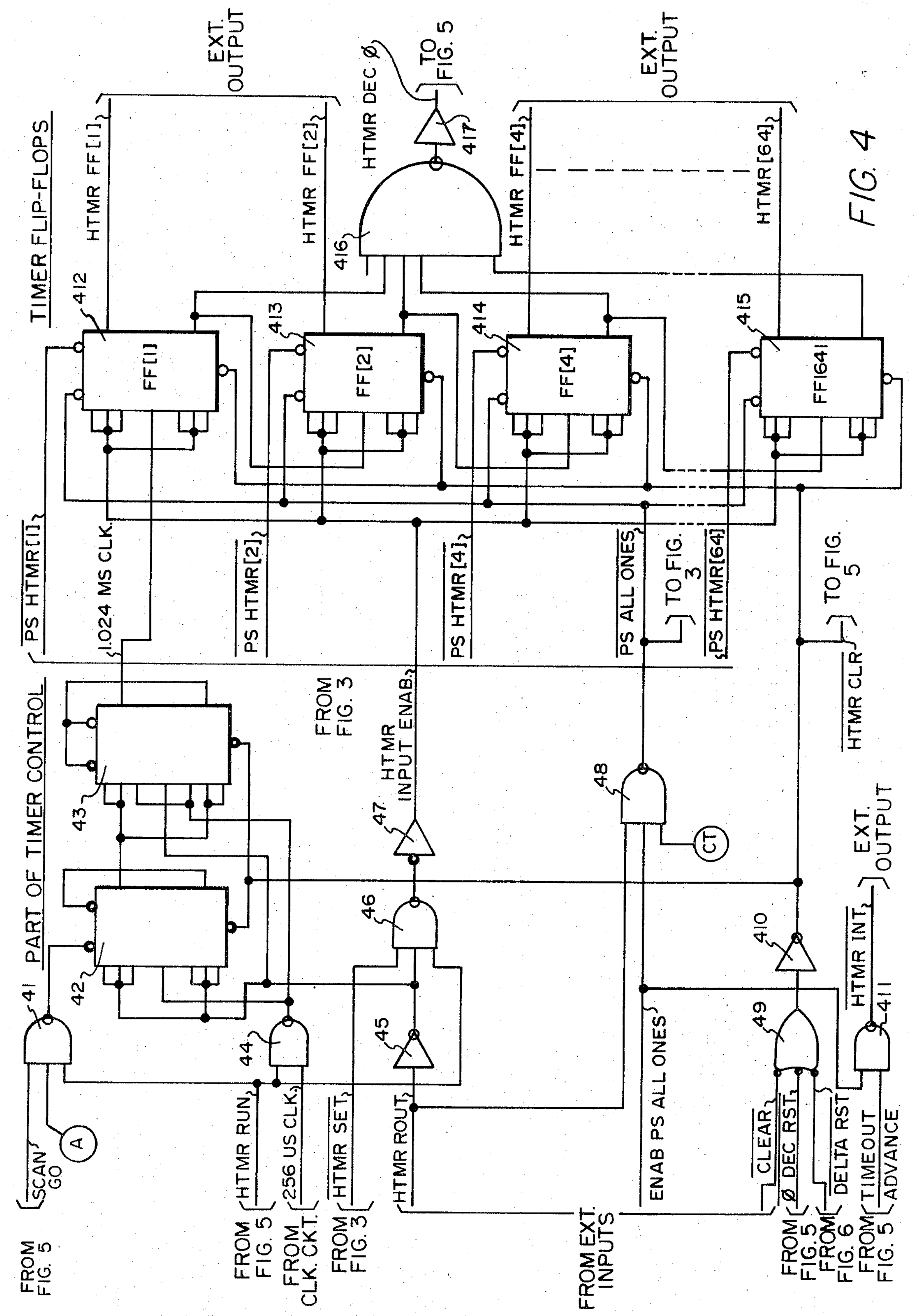
FIG. 4 is a simplified schematic of the timer control circuit.

The timer flip-flops, Block 12 of FIG. 1, are shown in FIG. 4. The four flip-flops shown are part of a six flip-flop backwards counting ripple-down counter clock input of each flip-flop tied to $\overline{Q}$ output of preceding flip-flop. For the circuit shown, the timer is driven from a 1.024 ms input, and can thus time intervals from 1 ms to approximately 130ms. However more flip-flops can be added to give an increased range 12 flip-flops are used in the MRL to allow timing to over 4 seconds. After being preset and enabled, the timer counts backwards to zero. Only one decode, zero is required.

Timer/Scanner Control

Figure 5:
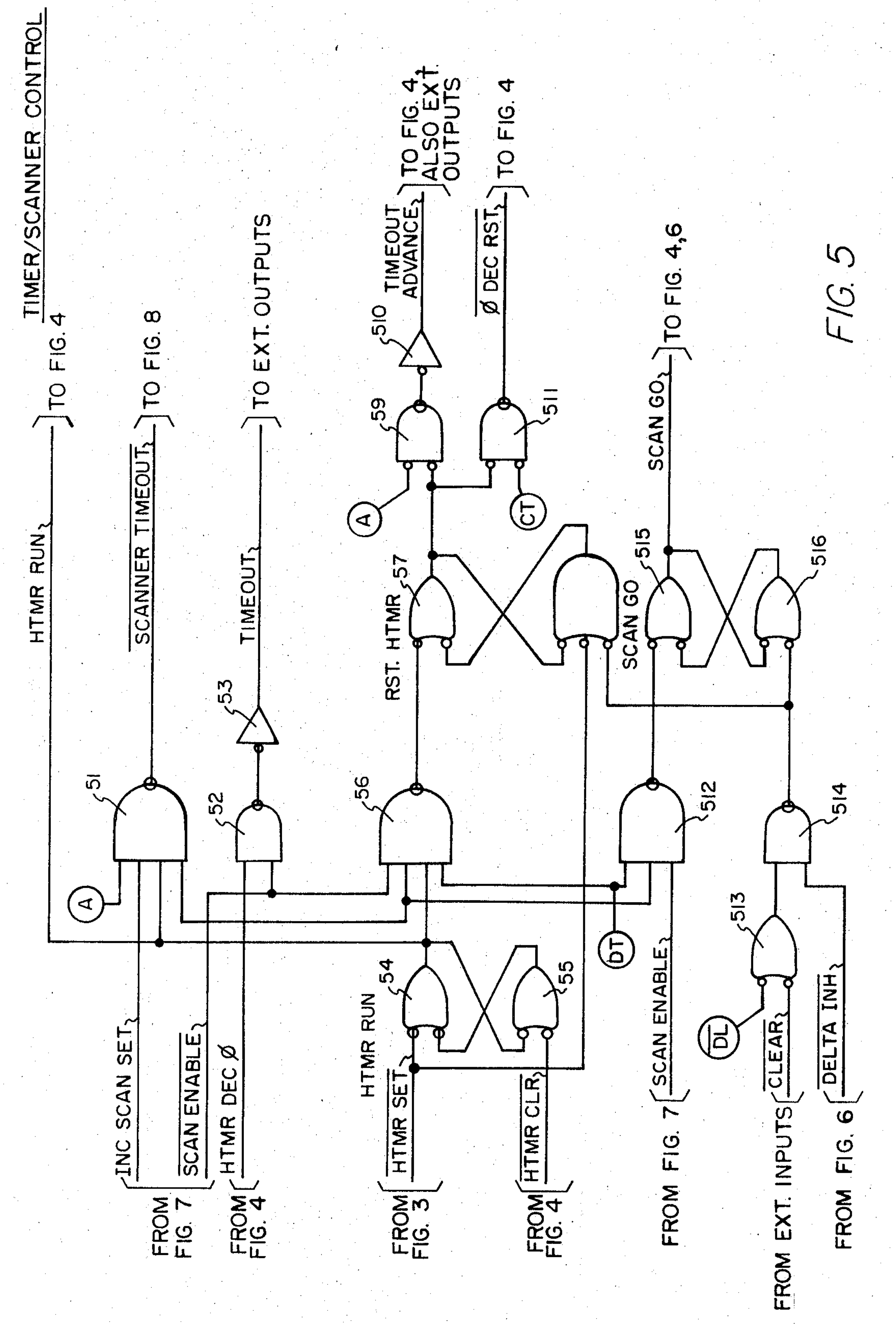
FIG. 5 is a simplified schematic of the timer scanner control circuit.
Figure 6:
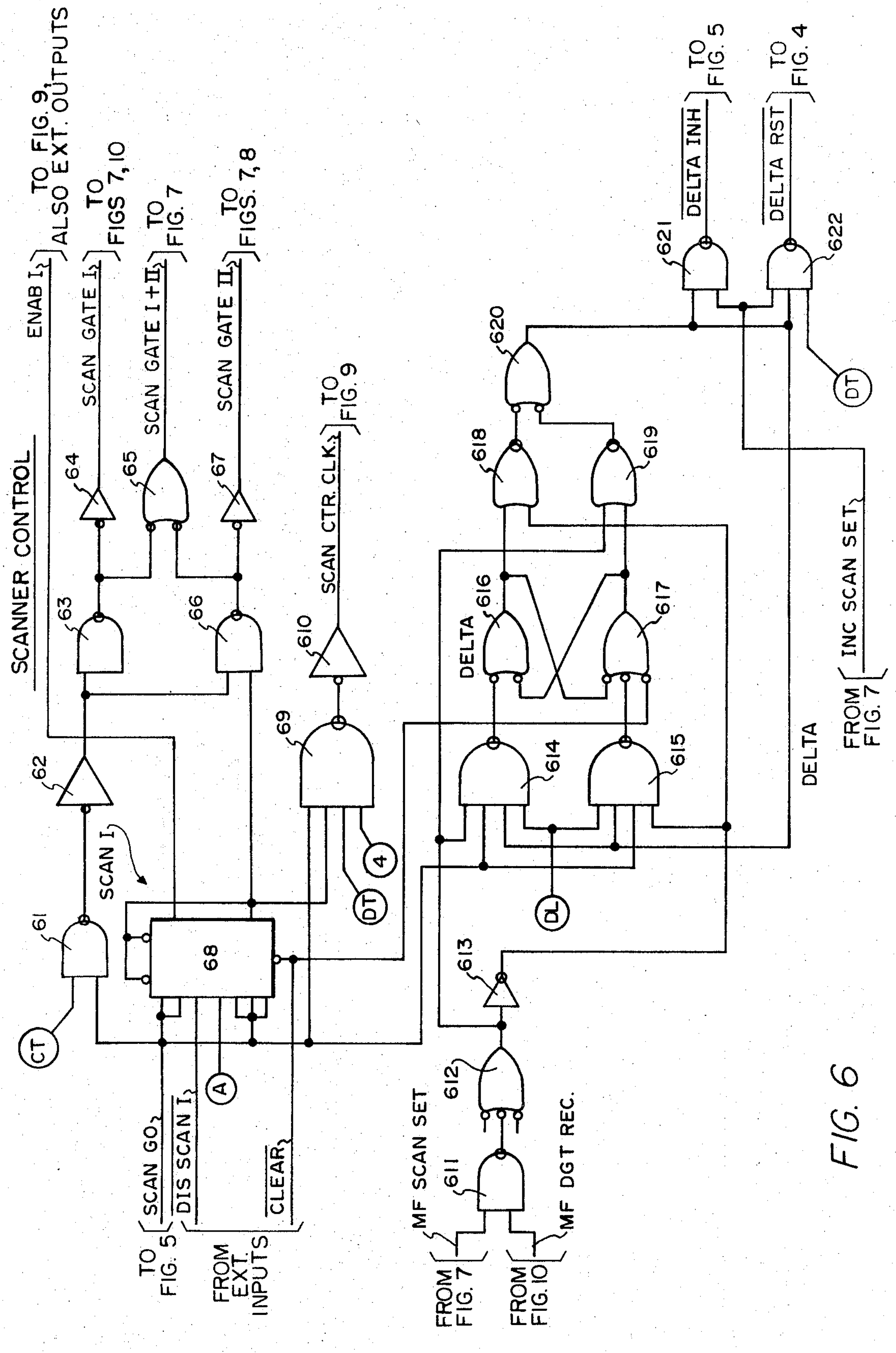
FIG. 6 is a simplified schematic of the scanner control circuit.

The timer/scanner control circuit, block 13 of FIG. 1, is presented in more detail in FIGS. 4, 5 and 6. It performs the following functions: presetting, enabling and clearing of the timer flip-flops; generation of output signals upon timeout; control of outpulsing and incoming scanning; and control of the timer/scanner for diagnostic routines. Further discussion of the control will be deferred until the detailed circuit operation.

Clock Circuit

Figure 2:
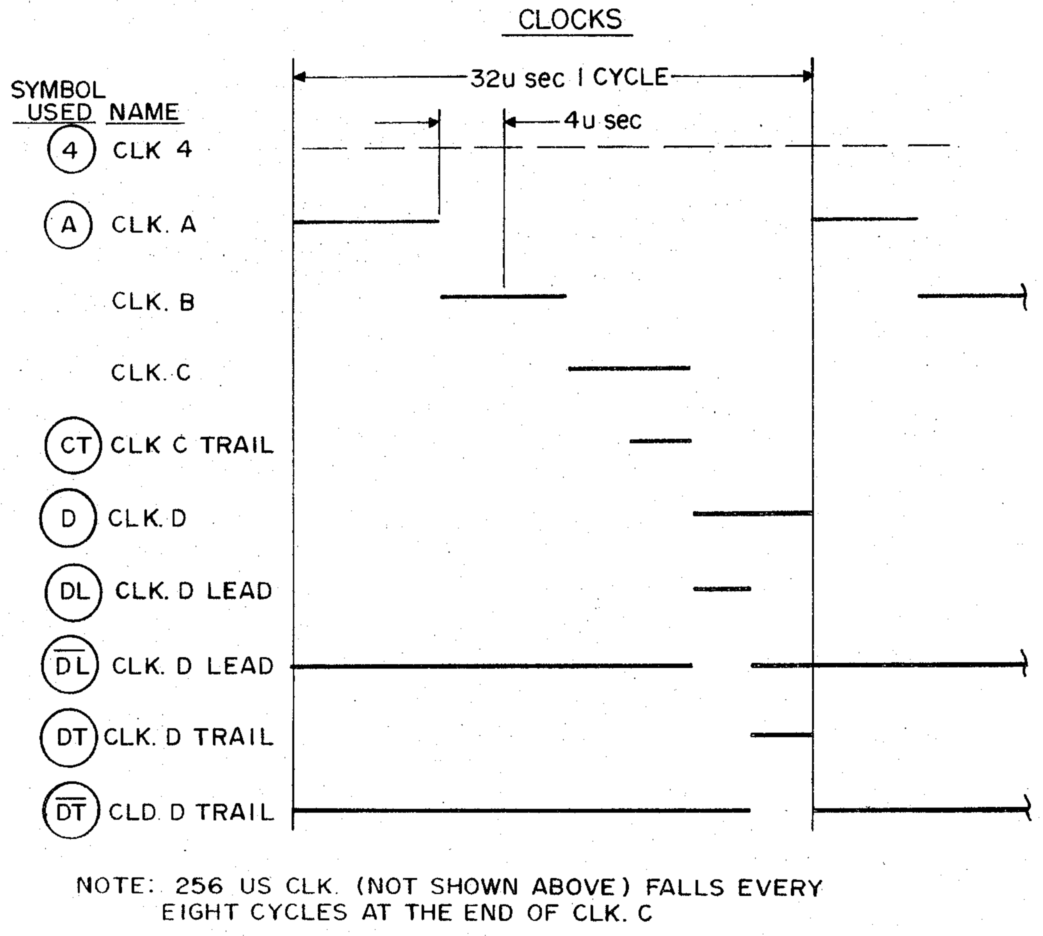
FIG. 2 is a chart showing the time pulse interrelationship.

The clock circuit is shown as block 14 of FIG. 1. All of the clock signals, which are shown in FIG. 2, are counted down from an 8 MHz crystal. A ring counter provides the basic four clock cycle, clocks A–D. Additional gating yields the remaining clocks. The circuit itself, which is not shown, also provides the clock signals for the remainder of the routiner logic in addition to the timer/scanner. The clocks are shown in the remaining figures as circles, e.g., (CT) for CLK C TRAIL. One additional clock signal, 256 US CLK, not shown in FIG. 2, feeds gate 44 on FIG. 4. This clock falls every 8, 32-μsec cycles at the end of CLK C, and has a 50% duty cycle.

Scanner Latches and Presets

As previously mentioned, the timer/scanner can perform both the functions of outpulsing and scanning of incoming pulse trains. For both these purposes the basic scan cycle is divided into two periods, $T_I$ and $T_{II}$. For MF and TCMF outpulsing, $T_I$ is associated with the "tone on" period, and $T_{II}$ is associated with the "tone off" period. For MF receiving the same holds true. For dial pulse, $T_I$ is associated with the break period, $T_{II}$ with the make period. The provision of two periods allows sending and receiving of asymmetrical signals; for example in the case of MF outpulsing the tone on period $T_I$ equals 65 ms, and the tone off period $T_{II}$ equals 35 ms. Inputs to the scanner from the routiner appear as momentary grounds on one of the $\overline{\text{SET XX YY/ZZ}}$ leads (FIG. 7 which set one of the scanner latches shown as block 15 of FIG. 1. The YY/ZZ refer to $T_I$ and $T_{II}$ respectively. At the beginning of the $T_I$ or $T_{II}$ periods, the appropriate preset leads are enabled to preset the timer via the timer presets, FIG. 3.

Figure 7:
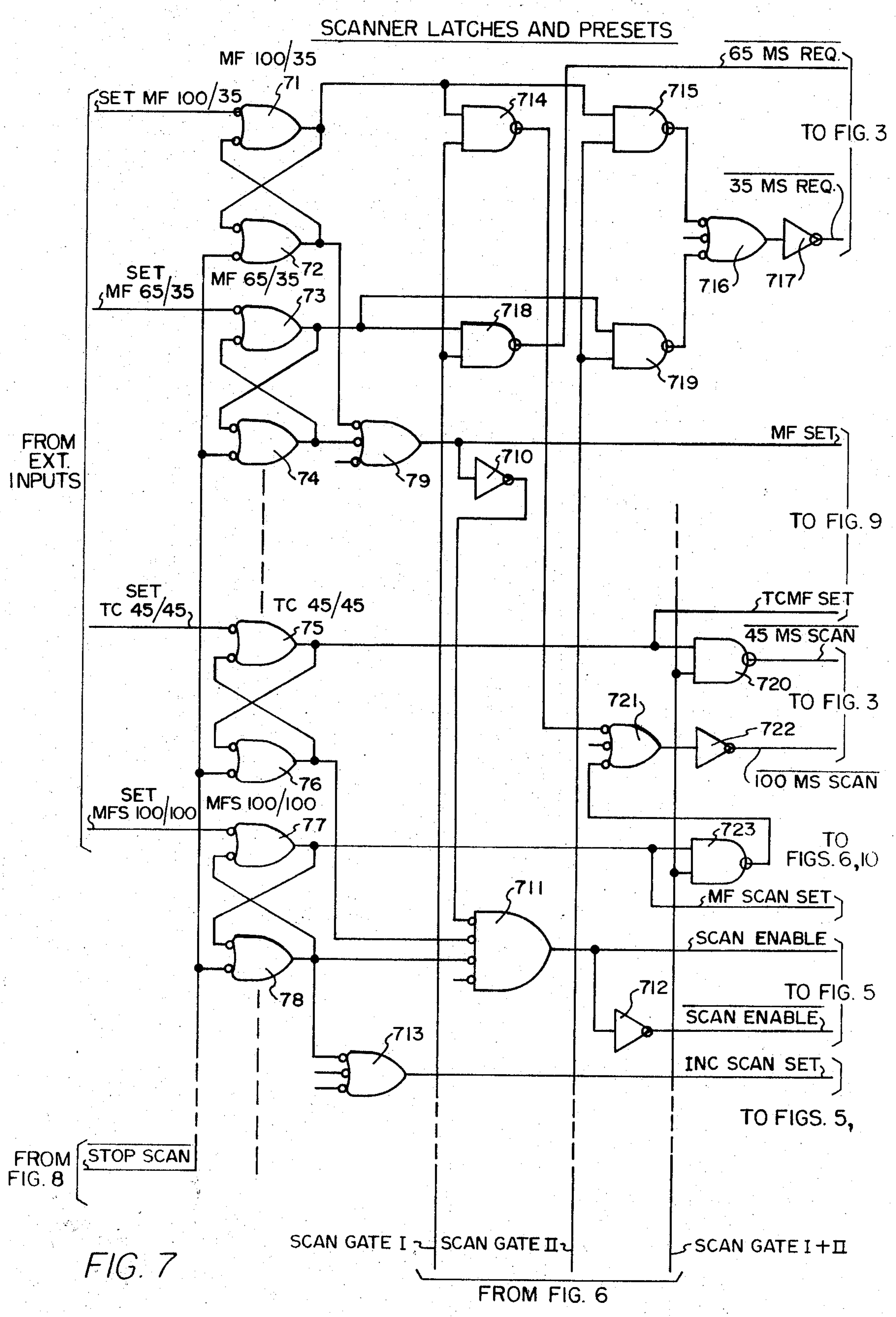
FIG. 7 is a simplified schematic of the scanner latch and preset circuit.

Only a few representative latches have been shown in FIG. 7. They are MF 100/35, for sending an MF "KP" digit; MF 65/35, for sending normal MF digits; TC 45/45, for sending normal TCMF digits; and MFS 100/100, for scanning incoming MF digits. In the latter case, $T_I$ and $T_{II}$ have been selected to be greater than the signal expected, normally 70/70 in this case.

Last Digit Latches and Control

Figure 8:
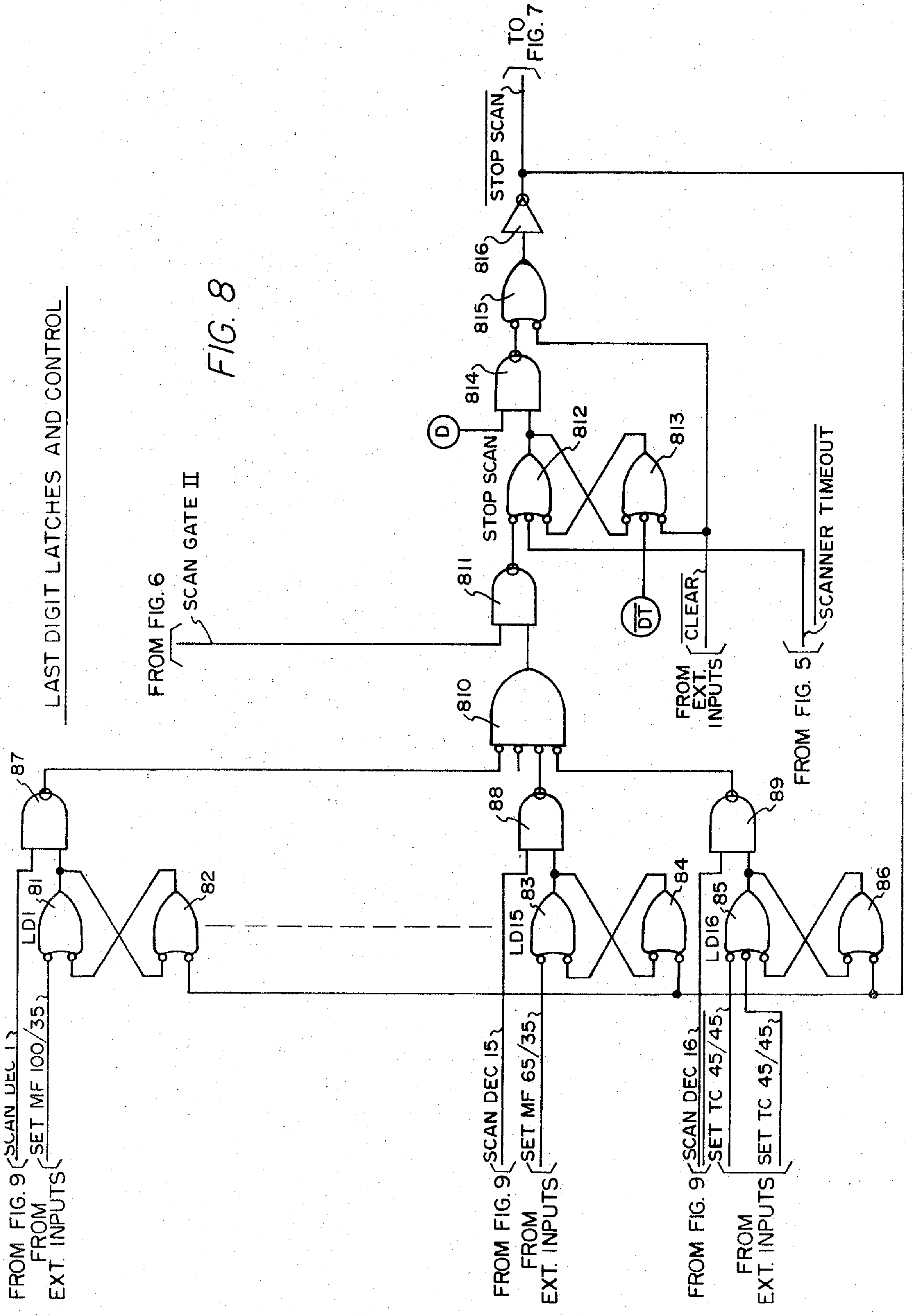
FIG. 8 is a simplified schematic of the last digit latch and control circuit.

The last digit circuit, block 16 of FIG. 1, is shown in FIG. 8. At the same time one of the scanner latches is set, one of the last digit latches LD1 thrugh LD 16 is set, via the same input lead. For outpulsing, the LD latch corresponding to the last digit to be outpulsed is set. For example, to send all 16 possible TCMF digits, LD 16 is set via $\overline{\text{SET TC 45/45}}$ (gate 85). For sending digits with different timing, such as MF, external control is required provided by the sequence state counter in the MRL. To send MF, just MF 100/35 and LD 1 are set to outpulse a KP digit. Following this operation, MF 65/35 and LD 15 are set to outpulse an additional 14 digits, the scanner starts from where it left off, at 1.

For incoming scanning, the last digit latch corresponding to one digit past the number expected is set. Thus, to receive an expected 15 MF digits, LD 16 is set.

While only three last digit latches are shown in FIG. 8, any number can be provided.

Scan Counter

Figure 9:
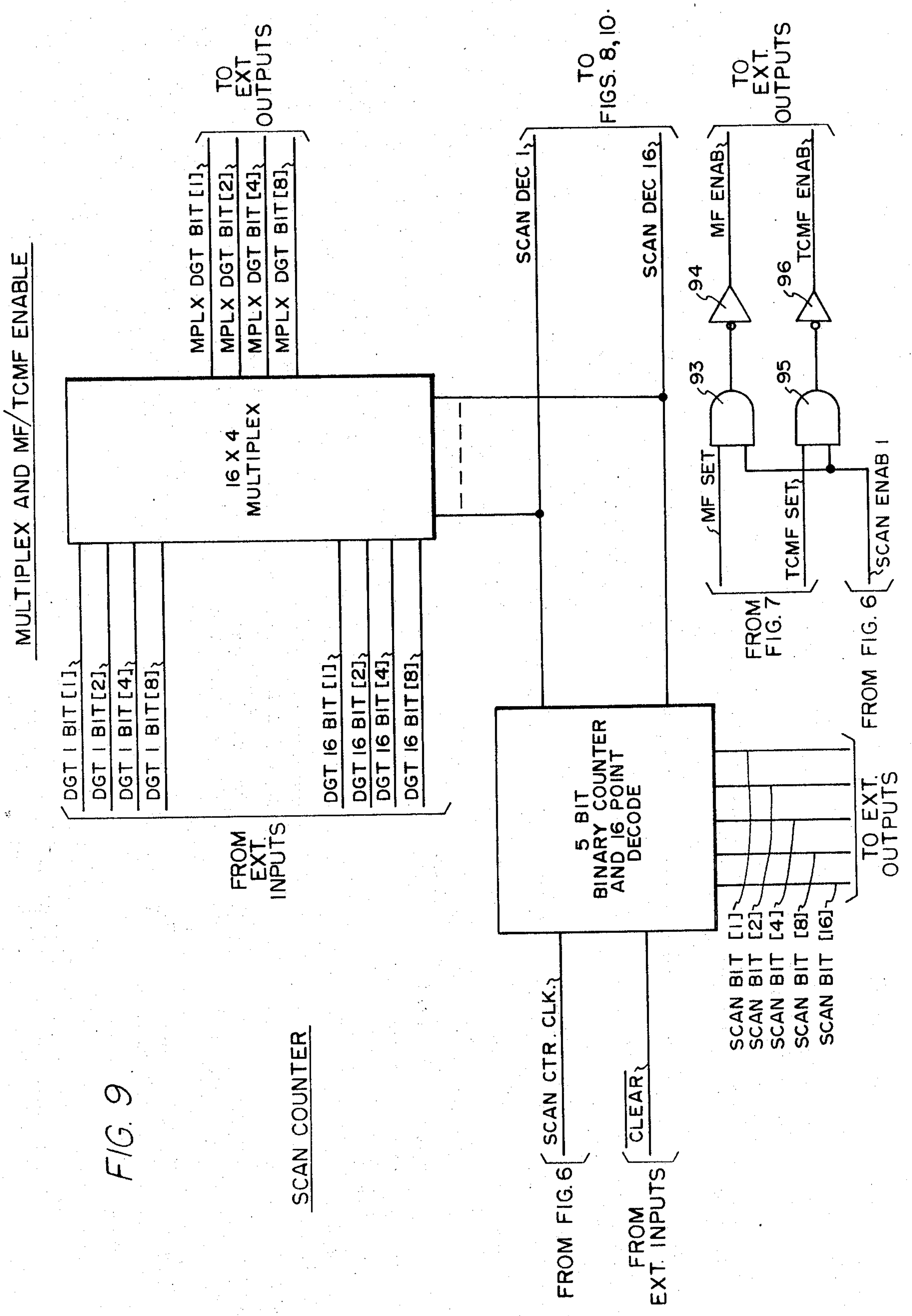
FIG. 9 is a simplified schematic of the multiplex and MF/TCMF enable circuit.

The scan counter, block 17 of FIG. 1, is also shown in FIG. 9. It is simply a binary counter, used to control progression of an outpulsing or incoming scanning function. Though shown for the circuit as a 5 bit counter with 16 point decode, any size counter can be used as appropriate. The binary output of the counter is available as external outputs, which in the case of the routiner are fed into the input buffer of the CPU.

The decimal decode of the scan counter is used to select digits from an output buffer for outpulsing, distribute received digits into an input buffer during incoming scanning, and stop the scanner operation via the last digit circuit.

Multiplex:

The digit multiplex, block 18 of FIG. 1, is shown in FIG. 9. It is used to select one of 16 BCD digits from an external register based on the value of the scan counter, and present the selected digit as external outputs; which, in the MRL, are fed to a MF/TCMF test tone sender. All the digits required need be loaded into the register, e.g., from the CPU only once, even when different timing is required, e.g., KP digit vs normal MF since the scan counter is not reset after each scanner operation.

MF/TCMF Send Enable

The MF/TCMF enable circuit, block 19 of FIG. 1 is shown at the bottom of FIG. 9. Depending on whether the scanner is outpulsing MF or TCMF, determined by the scanner latches, FIG. 7, either MF ENAB or TCMF ENAB will go high during $T_I$ (tone on period) to enable the MF/TCMF sender via the external outputs.

MF Receive Logic

Figure 10:
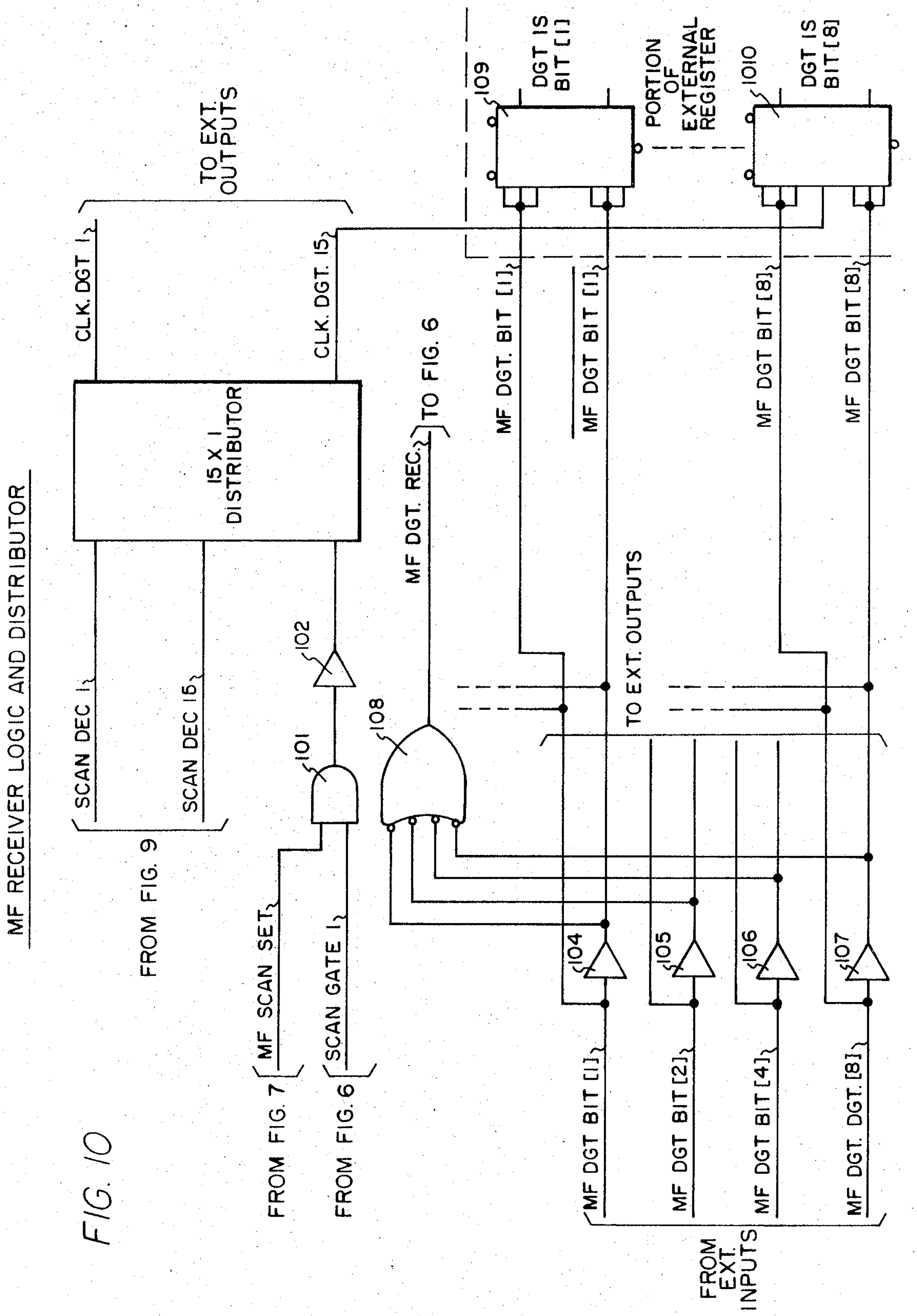
FIG. 10 is a simplified schematic of the MF receiver logic and distributor circuit.

The MF receive logic, block 110 of FIG. 1 is shown in FIG. 10 (lower left). In the case of the MRL, it receives MF digits in BCD form from an MF receiver, external inputs. It provides the true and complemented digit values to an external register, e.g., input buffer of the CPU. It also provides a signal MF DGT REC which is true when any MF digit is present.

Distributor

The digit distributor, block 110 of FIG. 1 is shown in FIG. 10. Based on the value of the scan counter, it clocks the appropriate four flip-flops (one digit) of an external register at the beginning of each $T_I$ period during incoming MF scanning. Since the incoming MF digit is multipled to all J/K inputs of the associated flipflops, this stores the digit in the appropriate set of flip-flops.

Detailed Description

A detailed description of the circuit will be presented by following through it for several different functions.

Simple Timing

The circuit as shown can be used to time intervals from 10 ms to 100 ms. A "request" for a timing interval of 10 ms will appear as a momentary ground on one of the inputs (REG HTMR IN) to gate 31, FIG. 3. External gating is such that this pulse is coincident with CLK X TRAIL, X = A, B, C or D: CLK C TRAIL was used in most cases in the MRL. This input will cause latch HTMR RUN, gates 54, 55 to set via gates 321 and 322. HTMR RUN gates the 256 US CLK to flip-flops 42 and 43 via gate 44.

2 μsec later, CLK 4 gates the input to set flip-flops FF[2] and FF[8] via gates 39, 310, 313 and 314. FF[2] is shown as gate 413; FF[8] is not shown but would be immediately below FF[4] in FIG. 4. During the time HTMR SET is low, the J and K inputs of the timer flip-flops are disabled via gates 46 and 47 to prevent clocking of the flip-flops as they are preset, $\overline{Q}$ outputs falling from "1" to 0".

Another 2 μsec later, at the end of CLK X TRAIL, the input returns to 1, HTMR SET also returns to 1, and gate 46 is enabled making HTMR INPUT ENAB high, enabling the J and K inputs of the timer.

Due to the clocking arrangement, negative input, of flip-flops 42 and 43, lead 1.024 MS CLK will first fall an average of 756 μsec after the preset input, assuming the input occurred during CLK C TRAIL. Additional clocks will occur every 1.024 ms. By having the first clock shorter this compensates somewhat for the offset introduced by the 1.024 ms clock for the shorter timing intervals. In general, the timing interval average for various presets will be:

$$t = t_i + 1.024\ (n-1)\ \text{ms}$$

where $t_i$ is the initial clock period, ranging from 0.644 ms to 0.868 ms, average 0.756 ms; $n$ is the preset value; and $t$ is the timed interval from the beginning of the preset to the timeout of the timer. For a preset of 10, this works out to be:

min $t$ = 9.860 ms
avg $t$ = 9.972 ms
max $t$ =10.084 ms

For larger presets, the binary preset value is adjusted to compensate for the offset; e.g., for a 100 ms request a preset of 98 is used, resulting in:

min $t$ = 99.972 ms
avg $t$ = 100.084 ms
max $t$ = 100.196 ms

After being preset and enabled, the timer counts backwards to zero, causing HTMR DEC 0 to go high, it had gone low when the flip-flops were preset, via gates 416 and 417. Lead TIMEOUT also goes high, via gates 52 and 53.

4 μsec after HTMR DEC 0 becomes true, CLK D TRAIL gates this signal and HTMR RUN, via gate 56, to set the RST HTMR latch, gates 57–58. Another 4 μsec later, CLK A enables gate 59 to cause TIMEOUT ADVANCE to go high, for the duration of CLK A. Thus two signals are produced upon a timeout: TIMEOUT, which is a level; and TIMEOUT ADVANCE, which is a pulse, produced during CLK A to be synchronous with the routiner's advance cycle. The first signal, TIMEOUT, is often used as a "mask" in the routiner to inhibit a false output of a detector for a given period of time, then enable it following the timeout. The second signal, TIMEOUT ADVANCE, used as a strobe, to gate the expected status of an external signal, advancing sequence states if true.

12 μsec after TIMEOUT ADVANCE returns to 0, CLK C TRAIL enables gate 511 resulting in a momentary ground on HTMR CLR via gates 49 and 410, resetting HTMR RUN via gate 55. Another 4 μsec later, CLK D LEAD resets RST HTMR via gates 513, 514 and 68, and the circuit returns to normal.

Note that HTMR SET is gated into the reset side of RST HTMR. This is in case a request on one of the external inputs appears during CLK B or C TRAIL immediately following TIMEOUT ADVANCE in CLK A. RST HTMR will be reset, inhibiting generation of the Ø DEC RST signal and clearing of the timer.

Outpulsing

The example used for outpulsing will be the sending of normal MF digits. It will be assumed that one digit, i.e., KP, has already been sent, so that the scan counter presently is at 1. Also digits have been loaded into the first 15 digit fields of the output buffer, input to the multiplex.

During CLK C TRAIL, a ground is placed on the lead SET MF 65/35, setting latch MF 65/35, gates 73 and 74, and latch LD 15, gates 83 and 84. Latch MF 65/35 set causes MF SET to go high, gate 79 and also SCAN ENABLE, via gates 710 and 711. 4 μsec after the end of CLK C TRAIL, CLK D TRAIL comes true, causing SCAN GO to be set, via gate 512. 2 μsec later, SCAN CTR CLK is enabled via gates 69 and 610, the SCAN I flip-flops will be reset. At the end of CLK D TRAIL, SCAN CTR CLK falls, incrementing the scan counter to 2, FIG. 9. 8 μsec later, CLK A falls, toggling the SCAN I flip-flop, gate 68, so it is set. This causes SCAN ENAB I to go high, which is true during $T_I$. Digit 2, selected from the external buffer via the multiplex, scan counter = 2, is present at the MPLX DGT outputs, fed to the MF sender. MF ENAB also is high, due to MF SET being true along with SCAN ENAB I, gates 93, 94. Therefore a digit will be sent out for the duration of SCAN ENAB I, $T_I$ = 65 ms.

12 μsec after CLK A falls, CLK C TRAIL comes true, causing SCAN GATE I to go high momentarily, via gates 61–64. This puts a momentary ground on the 65 MS REQ lead via gate 718. Through the timer preset circuit, FIG. 3 this presets the timer exactly as if a request had come in on the REG HTMR IN inputs, (See Section "Simple Timing"). HTMR DEC 0 goes low at the middle of CLK C TRAIL.

At the beginning of CLK D, CLK D LEAD, SCAN GO is reset via gates 513 and 514. However SCAN ENABLE still remains true since the scanner latch MF 65/35 is still set. Meanwhile the timer counts backwards, and HTMR DEC 0 becomes true at the end of a CLK C some 65 ms later. SCAN GO is set again via gate 512 during CLK D TRAIL, RST HTMR is not set due to SCAN ENABLE being low; also TIME OUT is inhibited for the same reason. At the end of CLK D TRAIL, the scan counter is not incremented, since the SCAN I flip-flops is set. SCAN I however is toggled at the end of CLK A, causing SCAN ENAB I to go low. This in turn causes MF ENAB to go low; $T_{II}$, tone off period. Thus SCAN I can be thought of as the least significant bit of the scan counter, however more importantly it indicates which part of the scan cycle $T_I$ or $T_{II}$ is in effect.

Also note that during CLK A, flipflops 42 is preset to 1 by gate 41. This guarantees the next timeout will occur at some integral number of 1.024 ms clocks − 256 μsec, or as expressed in Section "Simple Timing":

$$t = 0.768 + 1.024\ (n-1)\ \text{ms}$$

This is again done to compensate for the offset introduced by the 1.024 ms clock.

At the beginning of CLK C TRAIL, SCAN GATE II is enabled momentarily, causing the timer to be preset via lead $\overline{\text{35 MS REQ}}$ (gates 66, 67, 719, 716 and 717). SCAN GO is reset again at the beginning of CLK D. The next time the timer goes to zero, after 35 ms, the scan counter will be incremented again since SCAN I is reset. Then digit 3 will be selected and sent out for 65 ms tone on, 35 ms tone off. This process continues until the last digit (15).

The $T_I$ period of the last digit is no different from any other, except that after incrementing the scan counter the output of gate 810 will go high due to a match between the scan counter and LD 15. Nothing else unusual happens until $T_{II}$. Assuming the $T_I$ period of digit 15 just timed out, SCAN GO will be set as usual at the beginning of CLK D TRAIL, and SCAN I will toggle back to zero at the end of CLK A. At the beginning of CLK C TRAIL, SCAN GATE II will be enabled again. However this time the STOP SCAN latch (gates 812–813) will be set via gate 811. Meanwhile the timer will be preset for $T_{II}$ the same as the previous digits via $\overline{\text{35 MS REQ}}$.

At the beginning of CLK D, SCAN GO will be reset as before. However, the $\overline{\text{STOP SCAN}}$ lead will also go low via gates 814–816 resetting all scanner latches and last digit latches. The STOP SCAN latch itself will be reset 4 μsec later, CLK D TRAIL.

The timer flip-flops meanwhile will count backwards to zero. This timer however when HTMR DEC 0 becomes true, SCAN ENABLE will no longer be high, since it went low when the scanner latches were reset. Therefore the same functions that take place at the end of a simple timing interval Section "Simple Timing" will occur, i.e., setting of RST HTMR latch, generation of TIMEOUT and TIMEOUT ADVANCE signals, and resetting of HTMR RUN and RST HTMR latches. The TIMEOUT ADVANCE signal, which is generated only at the final timeout of an outpulsing operation, is the external signal back to the routiner that the operation is complete.

Incoming Scanning

Incoming scanning is in many respects similar to the outpulsing, in terms of the scanner's operation. The scan cycle is again divided into two periods: $T_I$ and $T_{II}$. However they are selected to be longer than the expected received signal; as long as the incoming signal changes state before the interval times out, the scanner continues; however if the signal does not change and a timeout occurs, the scanner stops. Also, the last digit latch corresponding to one count greater than the number of digits expected is set, so the scanner will also stop if more digits are received than expected.

Scanning of an incoming MF digit train will be used as an example. At the start it will be assumed that the scan counter is at zero and SCAN I is reset. Also, an MF digit has just been detected, in the routiner, detection of the leading edge of the first MF digit advances sequence states and the scanner is preset in the new sequence state. Therefore during CLK C TRAIL, a ground is placed on the $\overline{\text{SET MFS 100/100}}$ lead, setting latch MFS 100/100 gates 77 and 78 also setting LD 16, gates 85 and 86. $T_I = T_{II} = 100$ was selected as to be greater than the nominal 70 ms tone on, 70 ms tone off MF digits expected from a regular MF sender. LD 16 was selected as to be one greater than the number of digits expected (15).

Latch MFS 100/100 set causes MF SCAN SET to go high, also INC SCAN SET via gate 713, and SCAN ENABLE via gate 711. Note that MF DGT REC gate 108 will also be high since it was assumed an MF digit had been received.

At the beginning of CLK D TRAIL, two things happened. SCAN GO, gates 515 and 516, is set via gate 512, the same as during outpulsing. In addition, the lead $\overline{\text{DELTA RST}}$ goes low, due to a mismatch between the incoming signal, output of gate 612 high, and the DELTA latch, gates 616–617, detected by an Exclusive-OR circuit, gates 618–620. The $\overline{\text{DELTA RST}}$ signal causes $\overline{\text{HTMR CLR}}$ also to go low, which in this first instance has no effect, later however this action is an important part of the incoming scanning process.

At the end of CLK D TRAIL, the scan counter is incremented to 1 via gates 69 and 610. Then at the end of CLK A 8 μsec later, the SCAN 1 flip-flop is toggled. SCAN DATA I is again generated, as in outpulsing during CLK C TRAIL; this time the timer flip-flops are preset via the signal $\overline{\text{100 MS SCAN}}$, gates 723, 721, 722. Note that for $T_I = T_{II}$, a combined signal SCAN GATE I + II is actually used derived via gate 65.

In addition to presetting the timer, SCAN GATE I also stores the incoming digit into an external register, e.g., input buffer of CPU. Refer to FIG. 10. Depending on the value of the scan counter, a clock pulse generated via gates 101 and 102 is distributed to one of 15 clock lines, one for each digit. Each clock line drives four flip-flops in the register, storage for one digit. The true and complemented value of the incoming digit gates 102–107 are fed in BCD format to all of the flip-flops; the appropriate group of four is clocked via the selected clock line.

4 μsec later, at the beginning of CLK D LEAD, the DELTA latch is updated to reflect the current state of the incoming signal via gates 614–615. $\overline{\text{DELTA INH}}$ (gate 621) returns to 1, allowing the SCAN GO latch to be reset also, via gates 513 and 514. It was inhibited from resetting until after the DELTA latch was updated since SCAN GO is fed into gates 614–615, and an interlock was required.

The timer flip-flops then begin to count backwards to zero. However it will be assumed that the incoming signal changes state in its nominal time (70 ms), before the timer times out; in this instance the MF DGT REC line FIG. 10 will go low, corresponding to the tone off period of the first digit. MF DGT REC low will cause a mismatch again in the delta circuit during the next CLK D TRAIL; in this case the generation of the $\overline{\text{HTMR CLR}}$ signal is significant, as it will clear both the timer flip-flops and the HTMR RUN latch. The timer flip-flops being cleared causes HTMR DEC 0 to go high, which in turn causes SCAN GO to set via gate 512. However, since HTMR RUN is reset, gate 51 is not enabled, HTMR RUN being reset while HTMR DEC 0 and SCAN GO are true distinguishes between a delta reset due to a change in state of the incoming signal, and a timeout resulting from no change in state. The remaining actions during this SCAN GO period are similar to those discussed before, with SCAN I being reset, beginning of $T_{II}$, generation of SCAN GATE II, presetting of the timer, updating of the DELTA latch, and resetting of SCAN GO.

As long as the incoming signal changes state each interval before the timer reaches zero, this process continues, with the digit being stored into the input buffer during $T_I$ (actually SCAN GATE I) based on the value of the scan counter.

If in fact it continues until the scan counter reaches 16, meaning either more digits were received than expected, or noise was encountered, which created additional delta resets, the scanning operation will cease due to a match between the last digit latch LD 16 and the scan counter exactly the same as in outpulsing.

However, if exactly 15 digits are received as expected, then following presetting of the timer for the fifteenth $T_{II}$ period, no additional change of state will occur and the timer will continue counting all the way to zero. HTMR DEC 0 will come true, and now since HTMR RUN is also still set, gate 51 will be enabled during CLK A, causing $\overline{\text{SCANNER TIMEOUT}}$ to go low. In addition, SCAN GO was set as usual at the beginning of CLK D TRAIL, and the scan counter was incremented, to 16, at the end of CLK D TRAIL.

$\overline{\text{SCANNER TIMEOUT}}$ being low sets the STOP SCAN latch, gates 812–813; the remainder of the cycle is the same as if a last digit match occurred except in this case the timer will be preset to $T_I$. Then $T_I$ ms later, a TIMEOUT ADVANCE will be generated, the same as for a last digit reset.

In the routiner, the occurrence of a TIMEOUT ADVANCE following an incoming scanning operation causes an interrupt to the CPU. The CPU then comes out and reads its input buffer containing the incoming digits. Also via this buffer the CPU reads the status of the scan counter and SCAN I flip-flop to determine the type of termination. If the scan counter equals 16, and SCAN I is set, this implies the proper number of digits were received and a scanner timeout occurred as expected. If the scan counter equals 16 and SCAN I is reset, a sixteenth digit was erroneously received causing a last digit match. If the scan counter is less than 16, fewer than the expected digits were received.

Other Applications

The above three examples serve to illustrate the three basic functions of the timer/scanner. However the circuit has applications other than these examples which are used by the routiner. The scanner can be used to outpulse dial pulse by adding the appropriate scanner latch and gating for $T_I = 62$ ms and $T_{II} = 38$ ms, and using SCAN ENAB I to open a loop during $T_I$ break period. For this application, which is basically what is used in the register junctor routines, the value of the dialed digit is selected via the last digit latches, i.e., to outpulse a dial pulse digit of 2, LD 2 must be set.

The circuit can also be used to receive incoming dial pulse digits. For this $T_I$ can be 100 ms and $T_{II}$, 65 ms each selected to be greater than the break and make periods of the dialed digits. In addition, gating must be added to one of the inputs of gate 612 to gate the status of a battery feed relay, which follows the incoming digit, AND'ed with the new scanner latch for dial pulse scanning, so that the delta circuit will follow the change in state of the incoming pulses. As in the case of MF receiving, the value of the scan counter at the end will be one greater than the digit sent, and SCAN I should be set.

More complex patterns can be both outpulsed and received with the addition of external sequencing in the MRL this is accomplished through the sequence state counter. This scheme has already been mentioned in regard to MF outpulsing, in which first a KP digit is sent by setting latches MF 100/35 and LD 1, and loading digit 1 with a value of 11. Following the TIMEOUT ADVANCE signal, the external control advances sequence state and sets latch MF 65/35 and LD 15 to send 14 additional MF digits with normal timing.

The MRL also uses external sequence control to scan supervisory signals. For this purpose, in addition to the scanner and latch digit latches, still additional gating must be added to the third input of gate 612, in this case so the delta circuit can follow changes of state of the supervisory relay. One of the incoming signals scanned coming from a nonsynchronous test line consists of:

approximately
a. 1¼ seconds off-hook
b. ½ second on-hook
c. 1¼ second off-hook
d. 3 flashes of 120 IPM Between *c* and *d* a dynamic change of the scanner latches is done to adapt to the changing pattern.

Other applications are of course possible, but the above examples illustrate the uses of the circuit. In general, where it has shown specific sizes for various circuit blocks such as the number of timer flip-flops, size of the scan counter, multiplex, distributor, or number of scanner or last digit latches it was only for purpose of example and in fact no limit exists in the general architecture on these signs.

Also, the last digit latches could be implemented as a register, which could be loaded from the CPU (along with digit values), and equipped with a matching circuit between the output of this register and the output of the scan counter. This would allow the number of digits to be sent out to be variable rather than hardwired, without detracting from the general architecture of the timer/scanner.

Maintenance Considerations

In its application in the routining logic of No. 1 EAX, it is imperative that the timer/scanner be maintainable, as with any electronic subsystem in NO. 1 EAX. For this reason a minimal amount of circuitry was added to allow finding faults in the timer/scanner via simple diagnostic routines.

The fundamental signal for controlling diagnostics of the timer scanner is the HTMR ROUT lead, controlled by an external source (e.g., CPU). When it is true gate 46 is disabled, forcing HTMR INPUT ENAB low, which inhibits running of the timer flip-flops; but it does not prevent their being preset. Thus the timer flip-flops can be used as a diagnostic register.

To check the various preset values of the timer, first HTMR ROUT is made 1, and then one of the external request lines $\overline{\text{REG HTMR IN}}$ is grounded momentarily (in the MRL, this is done via a "test advance mode" of the sequence state counter (as outlined in application Ser. No. 348,806). The flip-flops of the timer are then checked for the appropriate preset, a ground is placed momentarily on the CLEAR lead to reset the flip-flops and the sequence is repeated for the next input.

To check for the proper setting of the scanner latches, and operation of the scanner presets, the same basic sequence can be followed, beginning with setting of the appropriate scanner latch. This will check the $T_I$ preset since SCAN I will toggle before the preset occurs. To check the $T_{II}$ preset for each latch, the same sequence is repeated with the lead DIS SCAN I grounded (gate 68). This disables setting of the SCAN I flip-flop, thus the $T_{II}$ preset will occur instead of $T_I$.

Following checking of all the presets, the operation of the timer itself is checked via a simple circuit. HTMR ROUT is made high again, along with ENAB PS ALL ONES. During the next CLK C TRAIL gate 48 is enabled, causing PS ALL ONES to go low, in turn presetting all of the timer flip-flops and setting the HTMR RUN flip-flops gates 321-322. HTMR ROUT is then made low ENAB PS ALL ONES is still high. This enables the timer flip-flops via gates 45, 46, and 47. At the same time the CPU resets HTMR ROUT, it collects real time from the system's real time clock. The timer counts backwards to zero, the same as any other simple timing operation. However when the TIMEOUT ADVANCE signal occurs, it causes an interrupt to the CPU via gate 411. The diagnostic routine collects real time again and compares the difference between the two values of real time with the running time of the timer for a preset of all ones, 129.8 ms for the timer shown; 4.19 seconds for the timer in the MRL. Since any fault in the flip-flops will cause an error of a factor of at leat two, or cause the timer not to function at al, the slight ambiguity introduced by the software real time clock (16.67ms) is of no consequence.

Checking the last digit latches can be done in one of two ways. The first is a functional check, in which the scanner is preset normally to perform a particular task and at the end the scan counter is checked if it matches the last digit latch set. However this requires time. The second scheme, though quicker, requires gating of the status of all the last digit latches to the external input buffer of the CPU. Then HTMR ROUT can be made 1, freezing the scanner, and after setting the latches their state can be examined via the CPU. This second scheme was used in the MRL.

This leaves only the scan counter and the delta circuit of the basic timer/scanner to be checked. They can be routined together provided the external control can simulate one of the signals gated into the delta circuit. With HTMR ROUT held at 1, and the appropriate scanner latch set, it is only necessary to toggle the incoming signals successively to exercise the delta circuit. In addition, the SCAN I flip-flop should follow the incoming signal, and the scan counter should increment each time the SCAN I flip-flop sets.

The remaining circuits such as the multiplex, distributor, etc. can be most easily checked functionally, i.e., verifying that they return expected results consistently in actual use.

What is claimed is:

1. A variable time interval measuring circuit for measuring a time interval as set by external control apparatus and comprising: a source of time pulses, a time interval binary counter means operably connected to said source of timed pulses, setting means operated by said external control apparatus to set said counter to a particular count, a decode means operated to produce an output upon said counter reaching said particular count, said decode means being arranged to decode only an all zero condition of said counter, a first plurality of register means, a first and a second coding means connecting each said register means to said setting means, whereby each said register means upon operation by said external control apparatus is effective to control said time interval measuring circuit to measure a first particular interval and a second particular interval, a second plurality of register means, each of said second plurality of register means upon operation by said external control apparatus effective to permit the restart of said first register means a plurality of times corresponding to the setting thereof, connect means connecting said second plurality of register means to said first plurality of register means, and control means connected to said second plurality of register means and operated from said output of said decode means to register an operation thereof.

2. A variable time interval measuring circuit as claimed in claim 1 wherein said second plurality of register means comprise a plurality of latches, and said control means includes a counter means operatively connected to said decode means and to said second plurality of register means to reset said second register means upon said counter reaching a count corresponding to said register means.

* * * * *